Patented Sept. 3, 1940

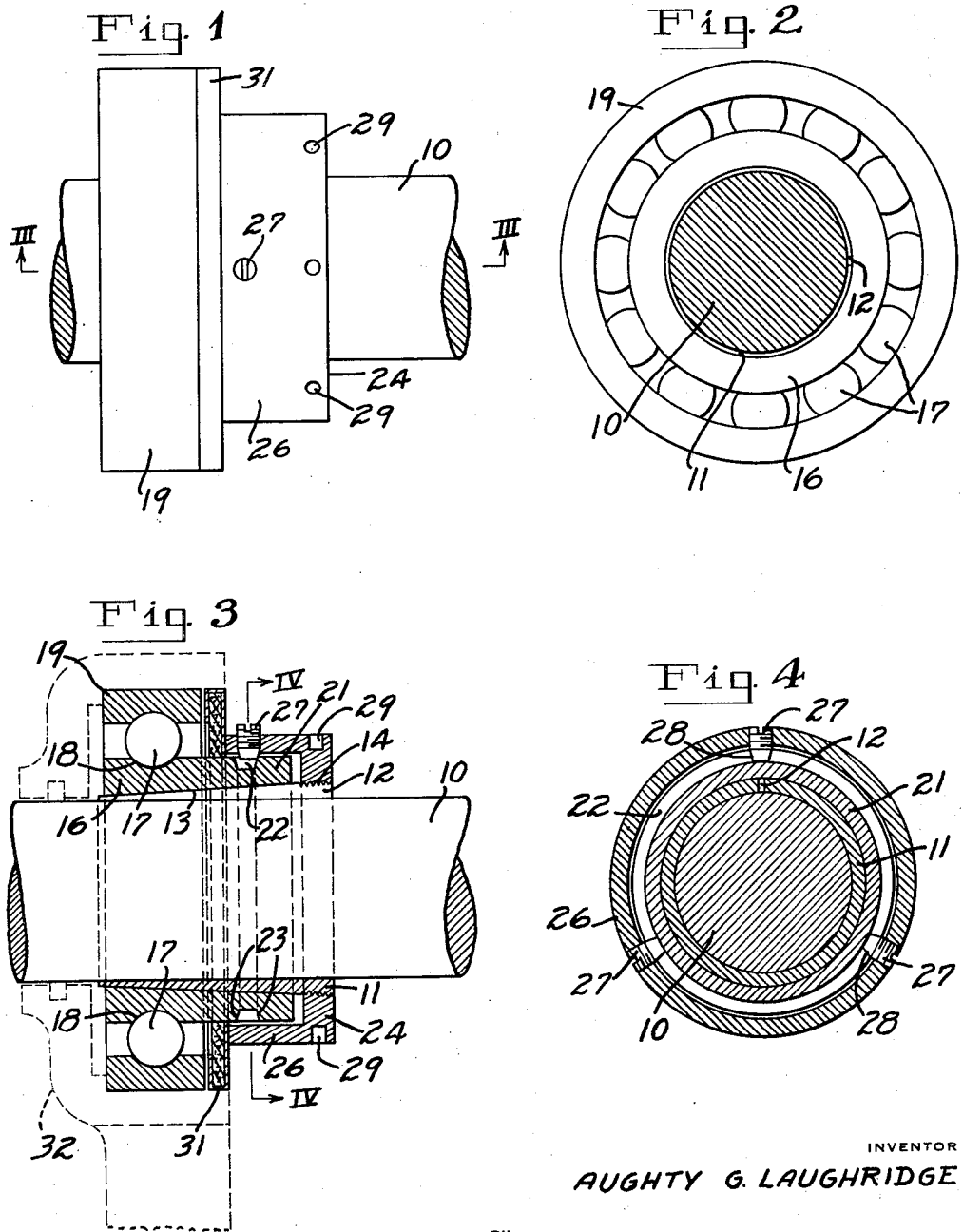

2,213,400

UNITED STATES PATENT OFFICE 2,213,400

ANTIFRICTION BEARING

Aughty G. Laughridge, Atlanta, Ga.

Application June 2, 1939, Serial No. 277,001

2 Claims. (Cl. 287—52.09)

My invention relates to an antifriction bearing adapted for mounting on a straight shaft, and has for an object the provision of a structure of the character designated which shall be simple of construction, easy of assembly, and adapted both for mounting the bearing on and dismounting it from a shaft.

A further object of my invention is to provide an antifriction bearing of the adapter type which shall embody a relatively wide, heavy inner race ring which shall have sufficient strength to obviate the danger of excessive stretching in mounting, and which shall include means for firmly mounting the ring on its adapter sleeve.

A still further object of my invention is to provide a ball bearing adapter which shall include a tapered adapter sleeve, a relatively wide, heavy inner race ring, means coacting between the sleeve and the ring to mount the ring on the sleeve and dismount it therefrom, and means to hold the parts in assembled relation against relative displacement.

Briefly, my invention comprises a cylindrical split sleeve adapted to fit about the shaft upon which it is to be mounted, and which has an outer inclined or wedging surface terminating in a cylindrical extension threaded on the outside. The inner race ring which fits over the sleeve is made relatively wide and has a lateral extension beyond the race, provided with an annular radially extending groove with sloping sides in its outer surface. Screwed on to the cylindrical extension of the split sleeve is a collar or set nut having a portion telescoping over the extension of the inner race ring. Means are provided to coact between the collar and the race ring to move the latter on and off the adapter sleeve and to hold the parts in assembled relation.

A bearing embodying features of my invention is illustrated in the accompanying drawing forming a part of this application, in which Fig. 1 is an elevation of my improved bearing mounted on a shaft;

Fig. 2 is an end view of the same;

Fig. 3 is a sectional view taken on the line III—III of Fig. 1; and

Fig. 4 is a sectional view taken on the line IV—IV of Fig. 3.

Referring to the drawing for a better understanding of my invention, I show my improved bearing mounted on a shaft 10. The bearing is comprised of a sleeve 11 split longitudinally at 12 so as to have a sliding fit about the shaft 10. The sleeve 11, as may be seen in Fig. 3, has a relatively long tapered or wedging outer surface 13, and at its thicker end terminates in a cylindrical extension having a threaded outer surface 14. Fitting over the sleeve 13 is an inner race ring 16, the inner surface of which is complemental to the outer surface of the split sleeve 11. Antifriction elements 17 are mounted in the groove 18 provided in the race and cooperate with an outer race ring 19 to form the bearing. The antifriction elements 17 are illustrated as balls, though it will be apparent that my invention is equally applicable to other forms of antifriction bearings.

As will be seen in the drawing, the inner race ring 16 has a lateral extension 21 which extends beyond the outer race ring 19. The lateral extension 21 is provided with an annular groove 22 therein, the annular groove having sloping sides 23.

Screwed on to the outer threaded extension 14 of the sleeve 11 is a set nut 24 which has formed integrally therewith a collar portion 26 of larger diameter which telescopes over the lateral extension 21 of the inner race ring. Extending through the collar portion 26 into the annular groove 22 are a plurality of set screws 27 which have tapered ends 28 adapted to fit the groove 22 and which have a number of important functions, as will be seen from a further consideration of the mounting of my improved bearng.

In assembling the bearing on the shaft, the sleeve 11 with the assembled bearing comprising the inner race ring 16, antifriction elements 17, and outer race ring 19, is slipped on the shaft 10, as shown in Fig. 3. The set nut 24 is then screwed on to the outer, thicker end of the sleeve 12 and the set screws 27 entered loosely into the groove 22, as shown in Fig. 3. The nut 24 is then turned in a direction to back it off the sleeve, there being provided in the nut suitable recesses 29 for engaging a wrench therewith. When this is done, the set screws 27 engage the side of the groove 22 in the inner race ring 16 and move it farther over on the split sleeve 11, tightly clamping the sleeve on to the shaft 10. When thus drawn on as tightly as possible, the set screws 27 are driven home, whereupon the tapered ends reacting against the sloping side of the groove 22, as shown in Fig. 4, draw the inner race ring 21 still farther on to the sleeve, and the screws then hold the parts 11, 21 and 24 against relative displacement.

To dismount the bearing, the operation just described is reversed. The set screws 27 are first loosened sufficiently to permit the nut 24 to turn relative to the inner race ring 16 and to be screwed on to the sleeve 11. Screwing the nut on to the sleeve pushes the inner race ring off, and thus permits disassembly of the parts. This is very important, as bearing constructed as heretofore known in this art often "freeze" on to the shaft and have to be burnt off or cut away with an electric or acetylene torch.

My improved bearing is adapted for the usual grease seal 31, which may be mounted between the telescoping portion 26 and the outer race ring 19, as shown in Fig. 3. It is also adapted for the usual protective housing, an example of which is shown in dotted lines at 32.

From the foregoing it will be apparent that I have devised an improved antifriction bearing adapter which is simple of design and assembly, and which includes elements effective both as a mounting and dismounting means for the bearing. I wish it to be understood that I do not desire to be limited to the exact details of construction shown and described, for obvious modifications will occur to a person skilled in the art.

What I claim is:

1. In a device of the character described, a cylindrical adapter sleeve for mounting on a shaft and having an outer tapered surface, a collar having an inner surface complementary to that of the adapter sleeve, a lateral extension on the collar having an annular groove with sloping sides in its outer surface, a threaded cylindrical extension on the thicker end of the adapter sleeve, a set nut threaded on to the extension of the sleeve and having a cylindrical ring portion telescoping over the lateral extension of the collar, and set screws having wedge ends carried by the ring, said wedge ends extending into the annular groove, said screws being adapted when loose to permit relative movement between the ring and the collar, and when being tightened to effect a final axial movement of the collar on the sleeve and to clamp the parts against further relative movement.

2. In a device of the character described, the combination with a cylindrical adapter sleeve for mounting on a shaft and having an outer tapered surface, a collar with an inner surface complementary to that on the adapter sleeve, and a threaded portion on the thicker end of the adapter sleeve projecting beyond the collar, of an extension on the collar adjacent the threaded end of said adapter sleeve, there being an annular groove in the outer surface of said extension, the side walls of which converge from the outer surface of the collar to the bottom of the groove, a nut on the threaded portion of the adapter sleeve, a ring extension on the nut telescoping over the extension on the collar, set screws in the ring portion of the nut adapted to fit into the annular groove and having beveled ends complementary to the sides of the groove, said screws adapted when being tightened to bear against a wall of the groove for the purpose of exerting tension on the collar to wedge it onto the adapter sleeve.

AUGHTY G. LAUGHRIDGE.